United States Patent
Barnes et al.

(10) Patent No.: US 8,971,171 B2
(45) Date of Patent: Mar. 3, 2015

(54) REDUCED FEC OVERHEAD IN AN OPTICAL TRANSMISSION SYSTEM

(75) Inventors: Stuart Barnes, Essex (GB); Martin Chown, Essex (GB); Stephen M. Webb, Kent (GB)

(73) Assignee: Xtera Communications, Inc., Allen, TX (US)

( * ) Notice: Subject to any disclaimer, the term of this patent is extended or adjusted under 35 U.S.C. 154(b) by 3092 days.

(21) Appl. No.: 10/510,731

(22) PCT Filed: Apr. 14, 2003

(86) PCT No.: PCT/GB03/01590
§ 371 (c)(1),
(2), (4) Date: Jun. 24, 2005

(87) PCT Pub. No.: WO03/088607
PCT Pub. Date: Oct. 23, 2003

(65) Prior Publication Data
US 2006/0050803 A1    Mar. 9, 2006

(30) Foreign Application Priority Data

Apr. 12, 2002 (GB) .................................. 0208560.3
Dec. 17, 2002 (GB) .................................. 0229543.4

(51) Int. Cl.
*H04L 5/12* (2006.01)
*H04L 1/00* (2006.01)
*H04J 14/02* (2006.01)
*H04L 25/14* (2006.01)

(52) U.S. Cl.
CPC .......... *H04L 1/0063* (2013.01); *H04J 14/0221* (2013.01); *H04L 1/0001* (2013.01); *H04L 25/14* (2013.01); *H04J 14/02* (2013.01)

USPC ........................... 370/215; 370/535; 714/752

(58) Field of Classification Search
None
See application file for complete search history.

(56) References Cited

U.S. PATENT DOCUMENTS

| | | | |
|---|---|---|---|
| 4,438,511 A | 3/1984 | Baran | |
| 5,225,922 A | 7/1993 | Chraplyvy | |
| 5,519,731 A | 5/1996 | Cioffi | |
| 5,546,190 A * | 8/1996 | Hill et al. | 398/76 |
| 5,838,797 A | 11/1998 | Iwasaki | |
| 5,960,067 A | 9/1999 | Riceman et al. | |

(Continued)

FOREIGN PATENT DOCUMENTS

| | | |
|---|---|---|
| DE | 101 13 303 A | 10/2002 |
| EP | 0 675 620 | 10/1995 |

(Continued)

OTHER PUBLICATIONS

U.S. Appl. No. 10/510,751, Jun. 2, 2008, Office Action.

(Continued)

*Primary Examiner* — Rhonda Murphy
(74) *Attorney, Agent, or Firm* — Workman Nydegger

(57) ABSTRACT

A transmission system for transmitting data over a channel in the form of a digital signal comprising bits of data, the system comprising an encoder for encoding the data prior to transmission, the encoder producing coding in the form of an overhead, and a decoder for decoding the data after transmission, characterised in that a first portion only of the data is encoded, the second portion remaining uncoded, the system further comprising a partitioner for partitioning the overhead from the uncoded data portion of the signal, after the first portion data has been encoded.

13 Claims, 8 Drawing Sheets

Transmitter arrangement        Receiver arrangement

(56) References Cited

U.S. PATENT DOCUMENTS

| | | | |
|---|---|---|---|
| 5,969,840 A | 10/1999 | Roberts | |
| 6,128,330 A * | 10/2000 | Schilling | 375/141 |
| 6,219,162 B1 | 4/2001 | Barnard et al. | |
| 6,269,129 B1 | 7/2001 | Rhee et al. | |
| 6,341,023 B1 * | 1/2002 | Puc | 398/79 |
| 6,433,904 B1 | 8/2002 | Swanson et al. | |
| 6,823,470 B2 * | 11/2004 | Smith et al. | 714/4 |
| 6,826,371 B1 * | 11/2004 | Bauch et al. | 398/188 |
| 7,526,205 B2 | 4/2009 | Chown et al. | |
| 7,529,489 B2 * | 5/2009 | Chiesa et al. | 398/138 |
| 2001/0034729 A1 | 10/2001 | Azadet et al. | |
| 2002/0054648 A1 | 5/2002 | Krummrich et al. | |
| 2002/0114034 A1 * | 8/2002 | Way | 359/124 |
| 2003/0099014 A1 | 5/2003 | Egner | |
| 2009/0269068 A1 | 10/2009 | Chown et al. | |

FOREIGN PATENT DOCUMENTS

| | | |
|---|---|---|
| EP | 0 828 357 A | 3/1998 |
| EP | 1 033 843 | 9/2000 |
| EP | 1 043 856 | 10/2000 |
| EP | 1 191 726 | 3/2002 |
| EP | 1 191 728 A | 3/2002 |
| FR | EP2043289 A1 * | 4/2009 |
| WO | WO 01/95549 | 12/2001 |
| WO | WO 02/071670 A2 | 9/2002 |
| WO | WO 02/096003 A1 | 11/2002 |

OTHER PUBLICATIONS

U.S. Appl. No. 10/510,751, Dec. 15, 2008, Notice of Allowance.
U.S. Appl. No. 12/431,310, Sep. 28, 2010, Office Action.

* cited by examiner

Dividing data over separate fibre

Dividing data over WDM Link

Dividing data between phase and amplitude modulation

Dividing data using QPSK

REDUCED FEC OVERHEAD IN AN OPTICAL TRANSMISSION SYSTEM

This invention relates to a transmission system for transmitting data in digital format, and particularly, but not exclusively to a transmission system for transmitting signals over a long distance, for example, long haul dense wavelength division multiplexing (DWDM) systems such as those used in submarine systems. The invention also relates to long haul over land systems such as cross continental terrestrial systems, and to encoders for encoding the data prior to transmission.

It is well known that when data is transmitted via a transmission system, errors may be introduced into the data due to noise in the system. The longer the distance over which the data is transmitted, the more errors are likely to be introduced into the data.

Because of the intolerance of computer systems and other electronic equipment to errors in transmitted data, it is known to use error detecting or correcting code to reduce or eliminate errors in the data.

It is known that the use of error correcting codes uses up available bandwidth in the channel that could otherwise be used for transmitting data. Thus the use of error correcting coding inevitably becomes a balance between complexity of codes and performance of data transmission.

Through use of error correcting codes the probability of an error remaining in the decoded data is, in most circumstances, much lower than the probability of errors existing in received data when codes are not used. This advantage is often described as coding gain. In other words, coding gain is the change in signal to noise ratio achieved by application of the code.

Mathematical systems such as Forward Error Correction (FEC) have been used in all forms of transmission such as satellite, microwave, wireless and optical systems. It is known to use a code known as the Reed-Solomon Code for example, which represents an acceptable compromise between complexity of codes and performance of transmission.

Reed-Solomon codes are block based error correcting codes with a wide range of applications in digital communications and storage. The Reed-Solomon encoder takes a block of digital data and adds redundant bits. A Reed Solomon encoder takes k data symbols of s bits and adds parity symbols to make an n symbol code word. There are n-k parity symbols of s bits each. A Reed Solomon decoder can correct up to t symbols that contain errors in a code word, where 2t=n-k.

The use of codes such as Reed Solomon codes, results in overheads to the data being transmitted, due to the fact that a portion of the available band width is taken up with code rather than data. The overall coding gain, taking into account the overhead is known as net gain.

It has been necessary to use higher forms of coding to overcome line impairments in long haul DWDM systems due to the distance over which data is transmitted.

A problem with higher forms of Forward Error Correction is that they apply a significant overhead to the data. These overheads cause overheads in themselves, reducing the overall net gain. The complexity of codes required for use, for example, in 40 Gbit/s transmission systems means that the coding gain achievable is not sufficient to compensate for greater transmission impairments experienced over the transmission system.

According to a first aspect of the present invention there is provided a transmission system for transmitting data in the form of a digital signal comprising an information sequence, the data being transmitted at a predetermined rate, the system comprising a FEC encoder for transforming the information sequence into a FEC encoded sequence comprising FEC encoded data and a coding overhead, a partitioner for partitioning the encoded sequence into a plurality of sequence portions, so that the encoded sequence is transmitted as a plurality of separate channels, wherein the sequence portions are transmitted at a rate which is lower than, and not equal to, the predetermined rate.

According to a second aspect of the present invention there is provided an encoding system for encoding a digital signal comprising an information sequence, the encoding system comprising;

a FEC encoder for transforming the information sequence into an encoded sequence comprising the information sequence and a FEC coding;

a partitioner for partitioning the encoded sequence into a plurality of sequence portions such that each sequence portion may be transmitted on a different channel, wherein the sequence portions are transmitted at a rate which is lower than, and not equal to, the predetermined rate.

By means of the present invention, it is possible to improve the "bandwidth times distance" product of the transmission system. Although this is important in all transmission systems, it is particularly important in long haul systems such as transcontinental, terrestrial transmission systems or submarine systems.

The present invention is also particularly suitable for use with transmission systems in which it is difficult, expensive or sometimes impossible to add further hardware to the system in order to introduce more physical channels to the system. In order to improve the efficiency of such systems, it is therefore necessary to improve on the amount of available bandwidth which is usable.

Traditionally, the more data that is transmitted within a defined bandwidth, the higher will be the level of noise created in the system. In addition, the higher the level of data being transmitted in the system the higher is the system data rate and the smaller is the space available for accommodating coding overheads.

This means that with traditional transmission systems and encoding systems, it is effectively not possible to use all the available bandwidth since in the extremes of the available bandwidth, the coding gain is not sufficient to overcome the level of noise and therefore the net gain is negative.

By means of the present invention it is possible to for example add 100% overhead compared to the much lower levels of overhead which are traditionally used. This makes it possible to use more complex coding which compensates for the increasingly poor signal to noise ratio.

This is possible because the sequence portions are transmitted at lower data rates, and so more bandwidth is available for overhead, whilst still achieving the predetermined system data rate.

The encoder may encode the information sequence with any appropriate coding, but preferably the encoder encodes the information sequence with FEC coding.

As the encoded sequence is transmitted through a transmission system, errors are introduced into the bits forming the sequence. The level of errors is known as the bit error rate (ber). The raw error rate is the error rate introduced by transmission of the encoded sequence, and the delivered ber is the effective error rate in a received sequence i.e. in the encoded sequence after it has been decoded.

By using FEC, delivered ber can be reduced to low levels. In existing transmission systems, the encoded sequence is carried on an individual channel. This means that the presence of overhead requires the channel to handle higher bit rates than it was designed to cope with, and is thus prone to exhibiting greater errors.

According to the present invention, the encoded sequence is divided between two or more separate channels, the data on each channel being transmitted at a lower data rate than the overall system data rate. This avoids the exposure to increased raw ber as the overheads encroach on the limits of an individual channel. In other words, by dividing the encoded sequence between one or more separate channels, the bit rate can be reduced thus enabling the overhead to be more efficient.

The encoded sequence may be partitioned in any suitable way. For example, the encoded sequence may be split between two channels such that one part of the encoded sequence is identical to the information sequence, and the other part may be considered as the overhead.

In known transmission systems low code gain codes have been used in optical transmission because of the high overheads incurred with more complex codes. This is because components and clock speeds in known transmission systems are not able to cope with the high overheads incurred with more complex codes.

In order to deal with the problems associated with using more complex coding, the inventors have realised that if the encoded sequence is split into two or more channels, the rate of transmission in the channels can be reduced and more coding can be added to each channel so that the proportion of coding to the information sequence is higher than could be otherwise achieved.

In addition in optical transmission systems particularly long haul systems, there is a problem with noise accumulation through the transmission system. It is not possible to reduce the spacing of the optical amplifiers because the hardware is in fixed positions and not easily moveable. Through use of FEC, noise accumulation may be counteracted such that the transmission system may run at close to Shannon limits.

The partitioner may comprise a deserialiser.

Preferably, the invention further comprises a recombiner for recombining the encoded sequence after transmission.

The recombiner may comprise a serialiser.

Advantageously, the system further comprises a decoder for decoding the encoded sequence after transmission.

The partitioner may comprise quadrature phase shift key (QPSK). In such a system, the in phase channel carries one portion of the encoded sequence, and the quadrature channel carries another portion.

The recombiner comprises a differential phase shift keying (DPSK) demodulator which demodulates the signal into the encoded sequence before the sequence is decoded as it emerges from the system.

In some embodiments, the in-phase channel carries a portion identical to the information sequence, and the quadrature channel carries a portion equivalent to the overhead.

In another embodiment of the invention, the partitioner comprises a phase modulator which causes the encoded sequence portions to be transmitted in different phases.

The partitioner may comprise a wavelength multiplexer. The encoded sequence is then transmitted as two or more portions at different wavelengths. After transmission the wavelength demultiplexer recombines the coded sequence which is then decoded by the decoder.

As the encoded sequence is transmitted through the transmission system, it will be contained within one or more waveguides.

When the transmission system is an optical system, the waveguides each comprise optical waveguides.

In yet another embodiment of the invention the partitioner comprises a coupler which connects a first waveguide to a second waveguide. This results in a junction at which two separate waveguides emerge, one carrying a first portion of the encoded sequence and the second carrying a second portion of the encoded sequence.

An important advantage of using FEC is that error detection is also possible.

Error detection may be achieved with the existing FEC overhead, or else may be achieved through the addition of overhead.

This leads to important advantages achievable through the present invention.

Once the encoded sequence is transmitted over two or more channels, it is potentially vulnerable to higher error rates in either or one of the channels. This could mean that the system is only as good as the worst channel being used. However, it is possible to monitor the raw error rates of the channels and therefore to be alerted early to increasing error rates on one of the channels. This can be achieved either by making use of the existing error-detection (E-D) capability of FEC, or if more convenient, by adding a small additional E-D overhead to each channel.

During transmission, it is possible that the error rate on one channel deteriorates relative to the other channels. The encoded sequence as a whole is vulnerable to delivered errors as a result of increasing raw error rate in either of the two channels. By means of the present invention, there will be a lessening of the deterioration under these circumstances. This advantage will effect all the delivered information simultaneously regardless of the channel in which it is being transmitted.

Further, in the unbalanced situation in which the error rate on one channel is higher than that on another channel, the use of error detection may be used to estimate the raw bit error rate of the two (or more) channels. Once this information has been obtained, it is possible to optimise the decoding and/or the coding algorithms adaptively to suit the conditions prevailing.

In other words, the inherent redundancy in FEC may be shared in an optimised way between the two (or more) channels. This offers greater protection to the channel with the higher raw bit error rate. As a result in a situation where the error rate on the channels is unbalanced, further coding gain may be achieved.

In an extreme situation, one channel may become unacceptably noisy, then the entire encoded sequence may be switched to a single channel. This would mean using less FEC overhead temporarily.

According to a third aspect of the present invention there is provided a method of transmitting data in the form of a digital signal comprising an information sequence, the data being transmitted at a predetermined, rate, the method including applying forward error correcting code to the information sequence to transform the information sequence to an encoded sequence comprising the information sequence and a coding overhead, partitioning the encoded sequence into a plurality of sequence portions, transmitting the encoded sequence over a plurality of channels such that the sequence portions are transmitted at a rate which is lower than, and not equal to, the predetermined rate, recombining the encoded sequence and applying forward error correcting decoding to the encoded sequence after transmission.

Preferably the method further comprises the step of applying error detection overhead to the information sequence prior to transmission of the information sequence.

The invention will now be further described by way of example only with reference to the accompanying drawings in which:

FIG. 1 is a graph showing the relationship between of the probability of an errored block, Q, in an encoded sequence after transmission in a transmission system according to the present invention, where it is assumed that the signal part, S, of the codeword is transmitted on one channel, with raw ber qs, and the overhead part, O, is transmitted on another channel, with raw ber qo. The graph which is based on a simplified example, shows Q as a function of qo with qs held constant at $10^{-6}$. Curves are shown for three cases: optimisation for qo<qs, optimisation for qo>qs, and a balanced situation to be expected when no attempt is made to optimise the decoding algorithm.

Figure 1:
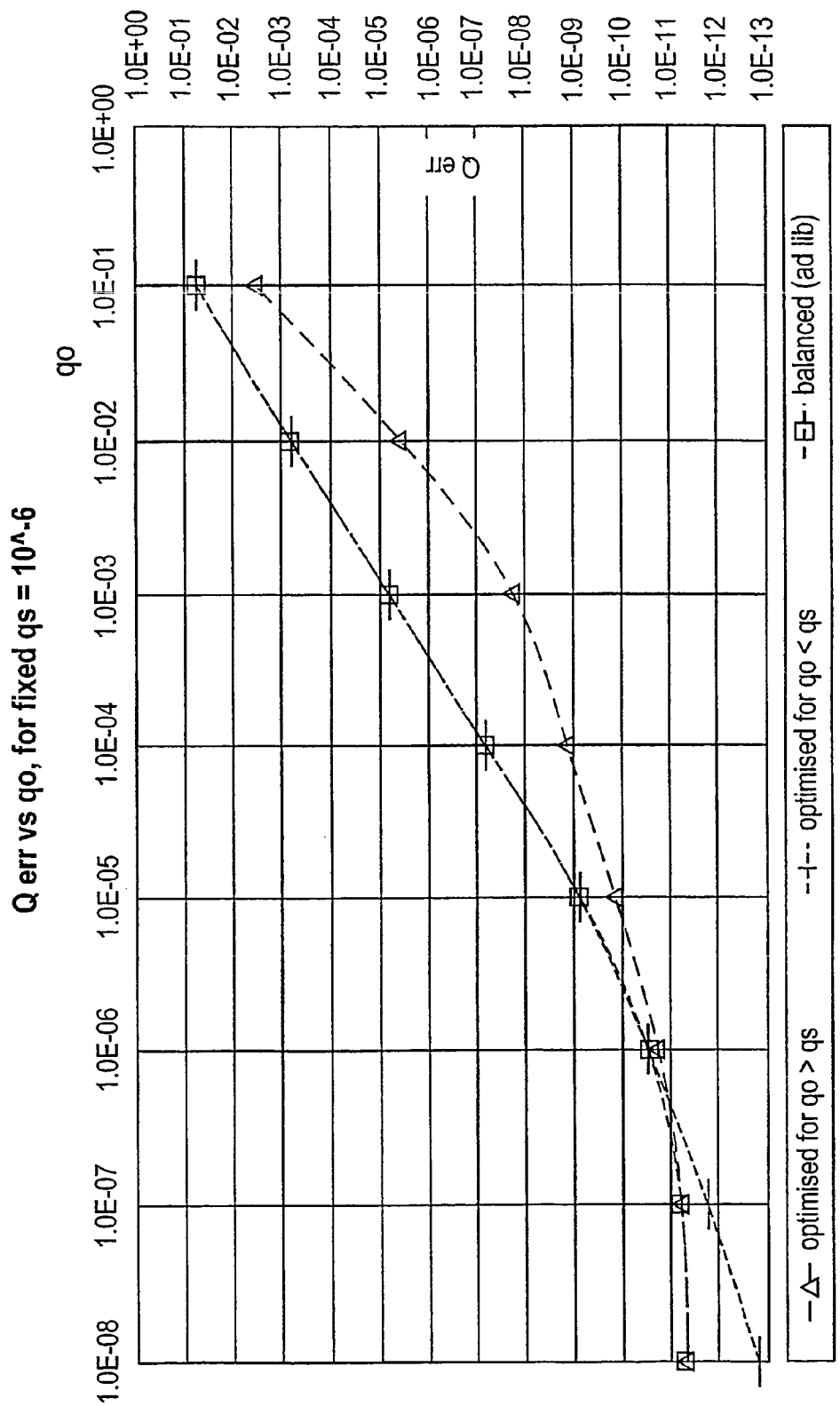
Figure 2:
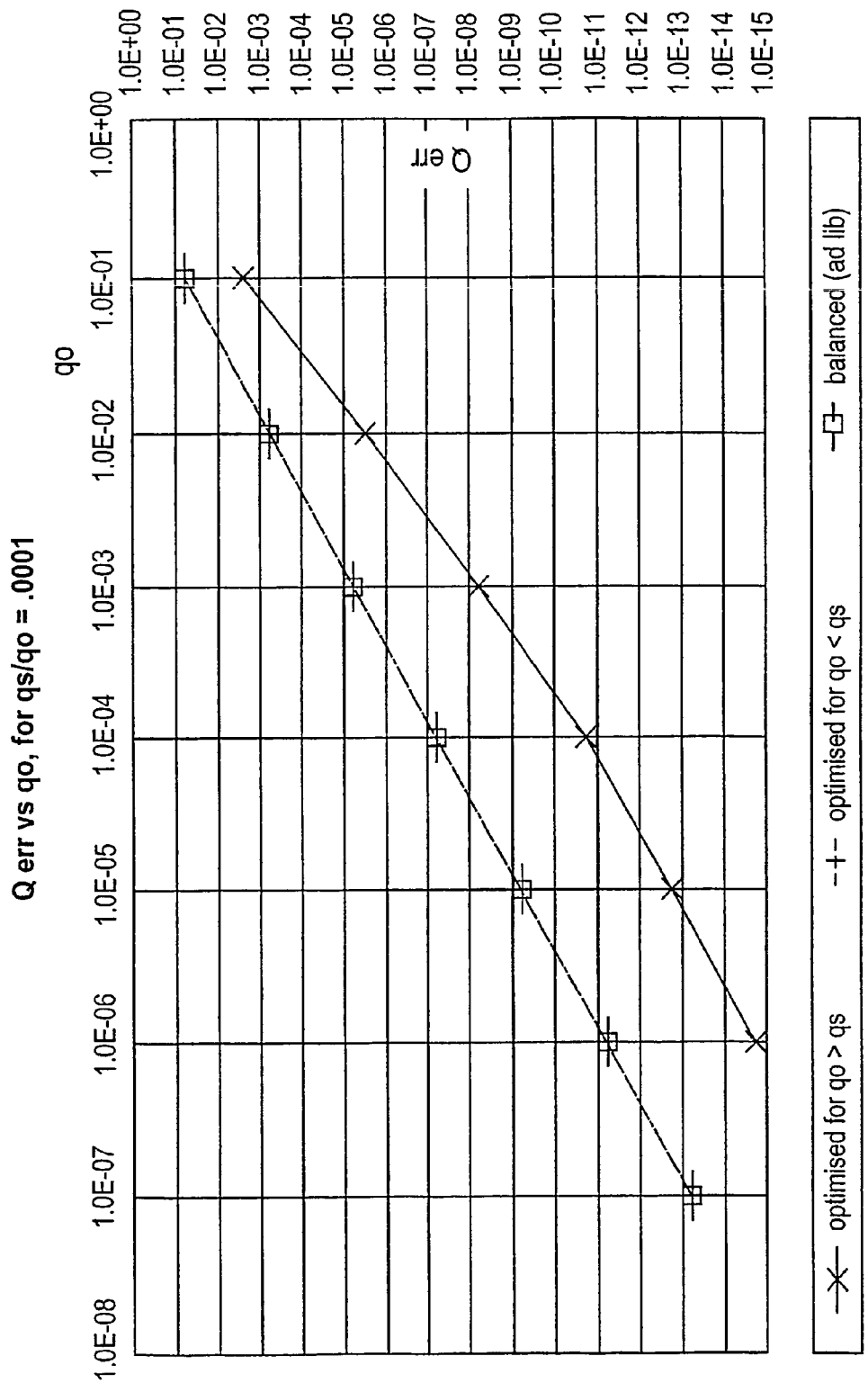
FIG. 2 is a graph showing the relationship between Q and qo when qs/qo equals 0.0001.

Referring to FIGS. 1 and 2, the performance of a transmission system according to the present invention is compared to a known transmission system.

In order to illustrate the principles of the invention, a simple code, a Hamming plus one parity bit code has been used. However it is envisaged that far more complex codes will be used in the present invention.

An information sequence of k bits can be coded into a code work of N (>k) bits. Although this amounts to N-k bits of overhead, it is not necessarily the case that the code word can take the following form: k bit positions always reproducing the original information sequence plus N-k bit positions representing the overheads.

However, many codes do have this property—i.e. the information sequence appears unaltered as part of the code word—and such codes are said to have a systematic structure. Hamming codes have this, so do BCH and most other block codes.

In the illustrated embodiment the code has the property of tolerating one error anywhere in the code word, plus the additional protection that a pair of errors can be tolerated so long as they both occur in a pre-determined half of the code. This has a systematic structure with the first four bit positions carrying the original information sequence(s).

| Information sequence | | | | Code Word, CW | | | | | | | |
|---|---|---|---|---|---|---|---|---|---|---|---|
| | | | | O | | | | S | | | |
| 0 | 0 | 0 | 0 | 0 | 0 | 0 | 0 | 0 | 0 | 0 | 0 |
| 0 | 0 | 0 | 1 | 1 | 1 | 0 | 1 | 0 | 0 | 0 | 1 |
| 0 | 0 | 1 | 0 | 0 | 1 | 1 | 1 | 0 | 0 | 1 | 0 |
| 0 | 0 | 1 | 1 | 1 | 0 | 1 | 0 | 0 | 0 | 1 | 1 |
| 0 | 1 | 0 | 0 | 1 | 0 | 1 | 1 | 0 | 1 | 0 | 0 |
| 0 | 1 | 0 | 1 | 0 | 1 | 1 | 0 | 0 | 1 | 0 | 1 |
| 0 | 1 | 1 | 0 | 1 | 1 | 0 | 0 | 0 | 1 | 1 | 0 |
| 0 | 1 | 1 | 1 | 0 | 0 | 0 | 1 | 0 | 1 | 1 | 1 |
| 1 | 0 | 0 | 0 | 1 | 1 | 1 | 0 | 1 | 0 | 0 | 0 |
| 1 | 0 | 0 | 1 | 0 | 0 | 1 | 1 | 1 | 0 | 0 | 1 |
| 1 | 0 | 1 | 0 | 1 | 0 | 0 | 1 | 1 | 0 | 1 | 0 |
| 1 | 0 | 1 | 1 | 0 | 1 | 0 | 0 | 1 | 0 | 1 | 1 |
| 1 | 1 | 0 | 0 | 0 | 1 | 0 | 1 | 1 | 1 | 0 | 0 |
| 1 | 1 | 0 | 1 | 1 | 0 | 0 | 0 | 1 | 1 | 0 | 1 |
| 1 | 1 | 1 | 0 | 0 | 0 | 1 | 0 | 1 | 1 | 1 | 0 |
| 1 | 1 | 1 | 1 | 1 | 1 | 1 | 1 | 1 | 1 | 1 | 1 |

The information sequence S is sent on one channel with bit error probability qs. The other four bits, the overhead, are sent on another channel with bit error probability qo. However other portioning could also be used.

Consider first any S and its code word CW. By looking at each of the 8 single-errored versions of this CW and decoding them as S, it can be seen that there is no overlap.

This does not always work for two errors; suppose 1100 0000 is received:

This could have been the first CW on the list with two errors 0000 0000 going to 1100 000 with errors in first two letters, or it could have been the second CW on the list with two errors 1101 0001 with errors in the third and eight letters.

However, we could take each CW and assign each single-errored version to the original S. In addition, we could take each CW and look at all six neighbouring versions that have two errors in the O part and none in the S part of the code word. Each of these is also assigned to the original S.

With this scheme, we can calculate the number of CWs assigned to each S as follows: 1 (for 0 errors) plus 8 (for 1 error) plus 6 (for 2 errors in 0 part), totalling 15.

Now, the 4 bits of overhead can carry 16, therefore it is in principle possible to assign 15 code words for each transmitted CW, and (for the example given) it is possible in practice. Changing any 2 bits of any CW will always change the S part by at least 2 bits and therefore the coding works for any S and CW.

The above scheme, which is more error-tolerant to the 0 part of the CW than the S part, would be advantageous when it is known that qo>qs. Conversely, when qo<qs, it is better to choose the S part of the CW to be tolerant to pairs of errors.

The probability of an error free block, P, can be calculated. In principle we look at $2^8=256$ of the possible code words that could be received for a given one sent. Each has its own probability of occurring, e.g. pppq pqpp for 1110 1011, given 1111 1111 sent, where q is the probability of bit error and p=1−q. All the words that correspond to an error-free decoded word are listed. Then, since they are mutually exclusive their probabilities are summed to give the total probability of an error-free word. The resulting sum is the probability that the information word has been coded back to the original, i.e. that there is no delivered error. The inverse Q=1−P, is of more relevance i.e. the probability of at least one error.

In the following, we use qo=bit error probability in the O part of the CW, qs=bit error probability in the S part, with po=1−qo and ps=1−qs. Then the probability that a given information word is decoded correctly is the sum of:
1. probability that the CW is received error-free, i.e. $ps^4 * po^4$ 2. probability that the CW is received with one error in S and none in O, i.e. $4*ps^3*qs*po^4$
3. probability that the CW is received with one error in O and none in S, i.e. $4*ps^4*po^3*qo$
4. probability that the CW is received with two errors in O and none in S, i.e. $6*ps^4*po^2*qo^2$ The above assumes the algorithm that is more tolerant to O: it would be used advantageously if there were prior evidence that qo>qs.

Collecting the above sum, we have $$P=ps^4*po^4+4*ps^3*qs*po^4+4*ps^4*po^3*qo+6*ps^4*po^2*qo^2$$

This formula is the basis of curves in FIGS. 1 and 2 corresponding to qo>qs. Here, Q=1−P is plotted as a function of qo and qs. While these figures demonstrate the advantage of the illustrating embodiment, an approximate form of the above formula offers the insight of an alternative view point.

Assume that qs<<1 and qo<<1, and expand as a series, we get $$P=1-6\ qs^2-16\ qo*qs+3^{rd} \text{ and higher order terms,}$$

So $$Q=6*qs^2+16*qo*qs+$$

Had it not been for the extra protection obtained by correcting for pairs of errors in the 0 part of the CW, we would have had an extra term, (6 qo²) on this sum for Q. For the situation where qo>qs, bearing in mind that a difference of several orders of magnitude is quite possible, we can see that the dominant term has been removed through this extra protection.

The key point is that the extra protection is effective only when it is adaptively applied to the bits in whichever channel is known to have the higher error rate.

In absence of adaptive protection, the worst case would result from allocating the resources to correcting pairs of errors where it is least needed, in the S part of the CW. In that case, we would have Q=6*qo²+16 qs* qo (obtained by swapping qo and qs).

There is an intermediate case in which the extra protection is given to four bits that straddle the two channels, and in this case the resulting formula is Q=5*qs²+12 qs*qo+5*qo². This might be a typical situation if no attempt were made to optimise the decoding algorithm and it can be seen that this "do-nothing" situation is little better than the worst case. In other words, unless special measures are taken, coded information shared between two channels will tend to see the delivered error rate corresponding to the worse channel.

For more complex codes, there is no restriction to a single choice as in the above example. For example there could be 10 errors corrected in one and 4 in another, or the first number could be increased at the expense of the second when the disparity between channels becomes greater.

Figure 3:
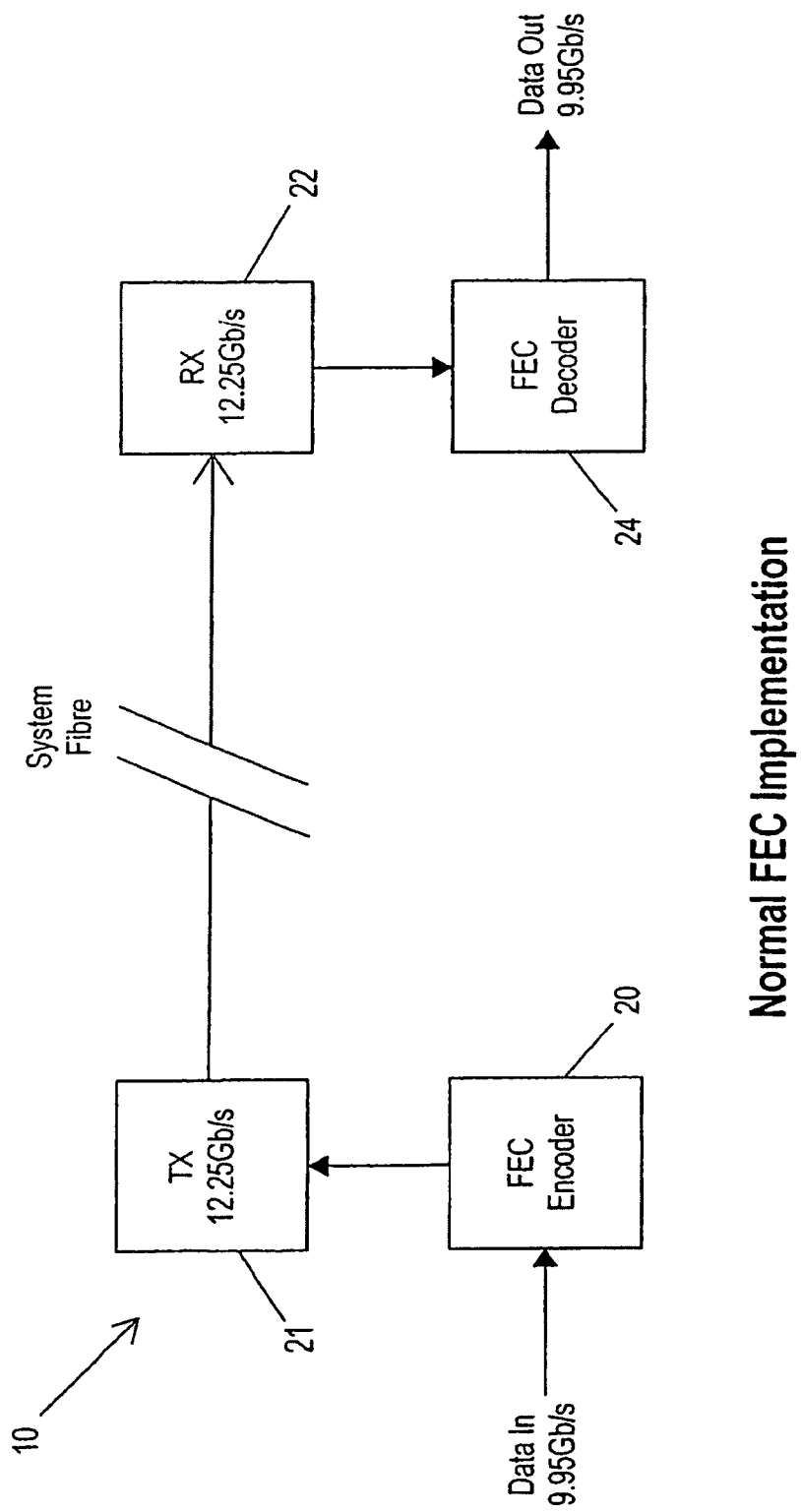
FIG. 3 is a schematic representation of a known transmission system incorporating known forward error correction.

Referring to FIG. 3, a known transmission system is shown and is designated generally by the reference numeral 10. The transmissions system 10 is an optical system suitable for use in for example submarine systems or terrestrial transcontinental systems. The transmission system 10 incorporates the standard FEC encoder 20 and decoder 24. The system also comprises a transmitter 21 and receiver 22 capable of transmitting and receiving data at 12.25Gb/s. In the systems shown in FIG. 3, an encoded sequence is transmitted down a single channel.

Figures 4A, 4B:
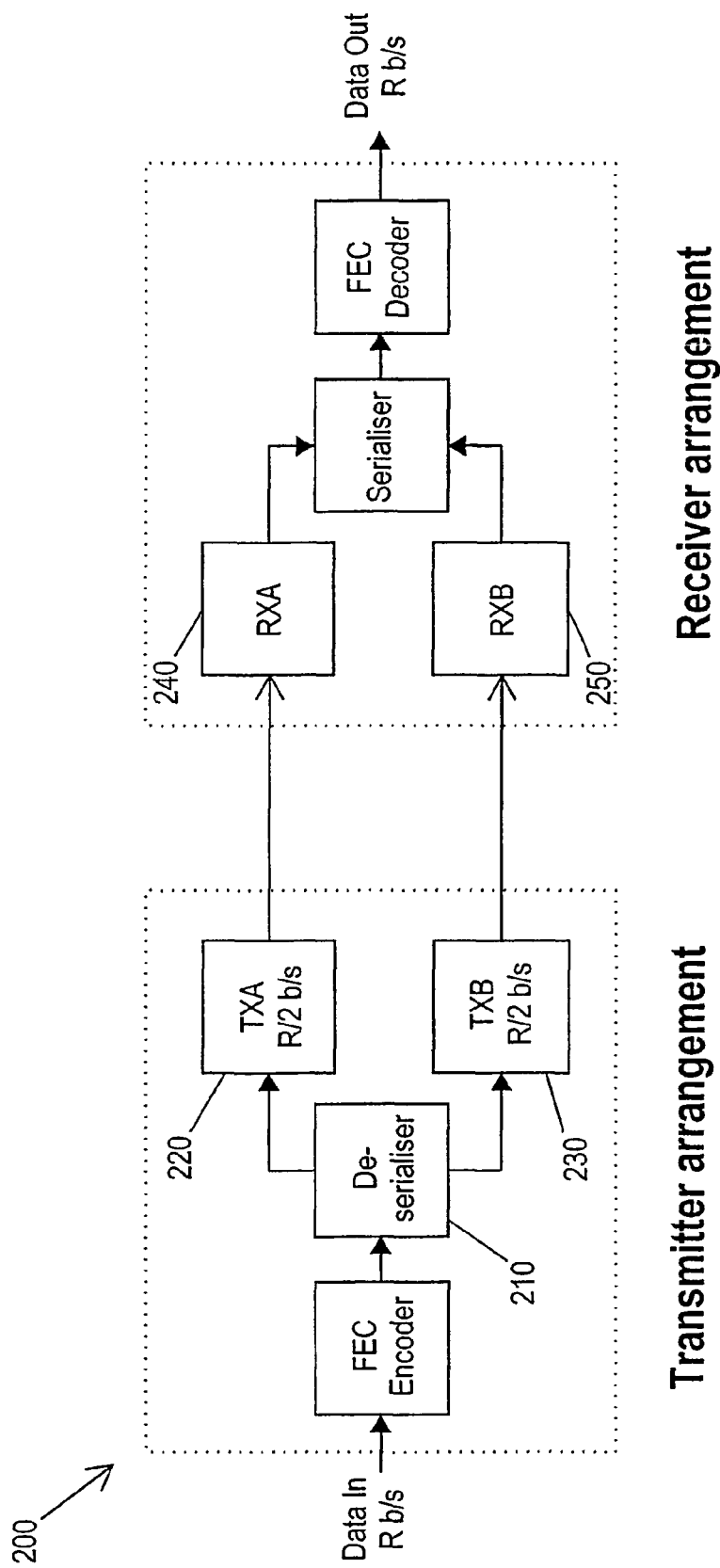
FIGS. 4a and 4b are schematic general representations of a transmission system according to the present invention, showing the transmitters and receivers.

Referring now to FIGS. 4a and 4b, a transmission system according to the present invention is designated generally by the reference numeral 200. The deserialiser 210 directs a portion of an encoded sequence to one transmitter 220 and a second portion of the encoded sequence to a second transmitter to 230. This means that both transmitters 220, 230 run at a lower data rate than would be the case if a single transmitter was transmitting the entire encoded sequence.

The system further comprises two receivers 240 and 250 respectively. One receiver output is interleaved with the other to reconstruct the original data stream.

A 50% duty cycle is applied to deserialiser 210 to disinterleave and transmit two separate 5 Gb/s per second carrying 10 Gb/s per second of data for example. This would then automatically give 3 dB of optical signal to noise ratio (OSNR) gain for each of the receivers 240, 250 since they run at half the rate that they would have to if the encoded sequence was not split between two streams. In addition, there will be less line transmittal penalties compared to traditional transmission systems since only 5 Gb/s per second of data is transmitted per transmitter/receiver rather than 10 Gb/s per second.

This means that the FEC overhead may be increased while still ensuring that the overall transition rate is less than 10 Gb/s per second. This gives more FEC advantage without incurring a need for line rates like 12.25 Gb/s or greater.

Figure 5:
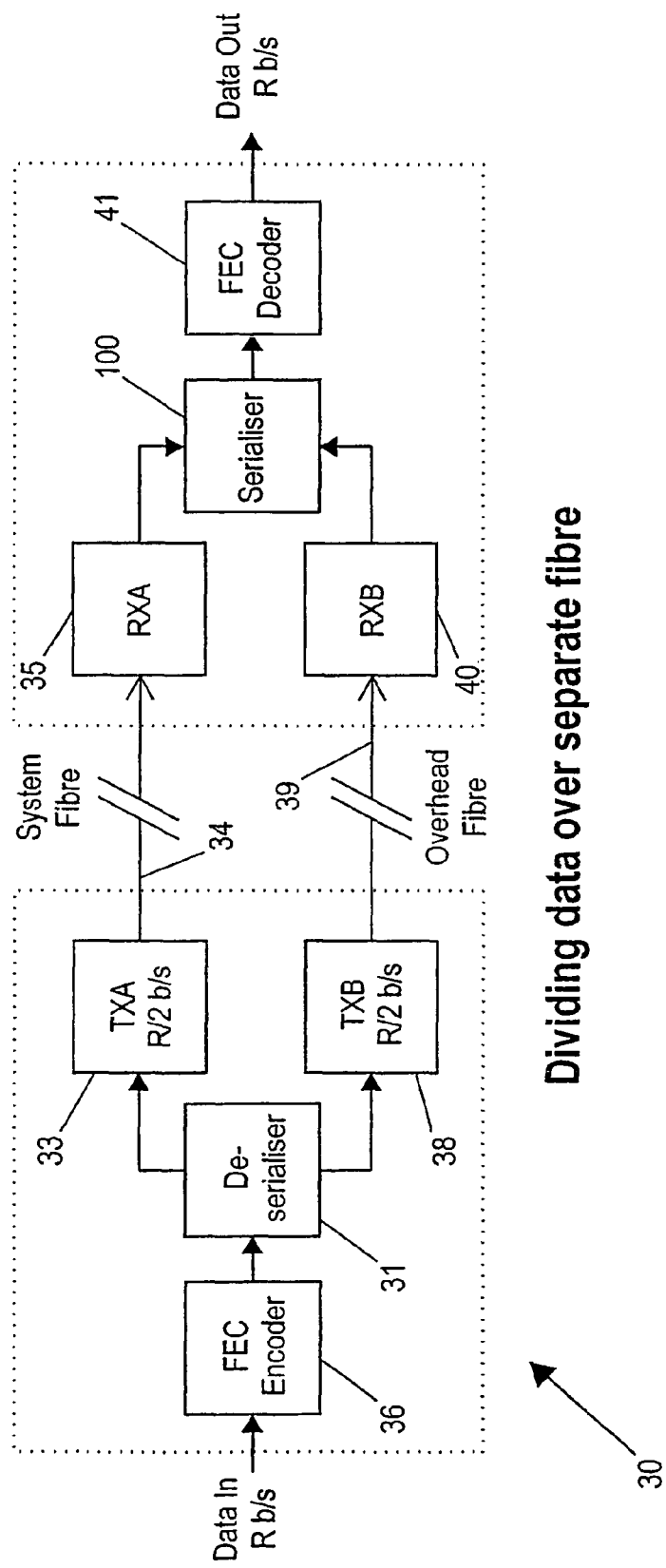
FIG. 5 is a schematic detailed representation of an embodiment of a transmission system according to the present invention.

Referring now to FIG. 5 an embodiment of the present invention comprises a transmission system 30. The transmission system 30 comprises a FEC encoder 36 and a partitioner 31 in the form of a deserialiser. The encoder 36 encodes the data to form a coded information sequence. The sequence is then divided by deserialiser 31 into sequence portions. Transmitters 33, 38 transmit the sequence portions.

The first sequence portion is transmitted by transmitter 33 via fibre 34, the system fibre to a receiver 35.

The second sequence portion is transmitted by transmitter 38 via fibre 39 to receiver 40. The sequence portions are then recombined by serialiser 100 before being decoded by FEC decoder 41.

Figure 6:
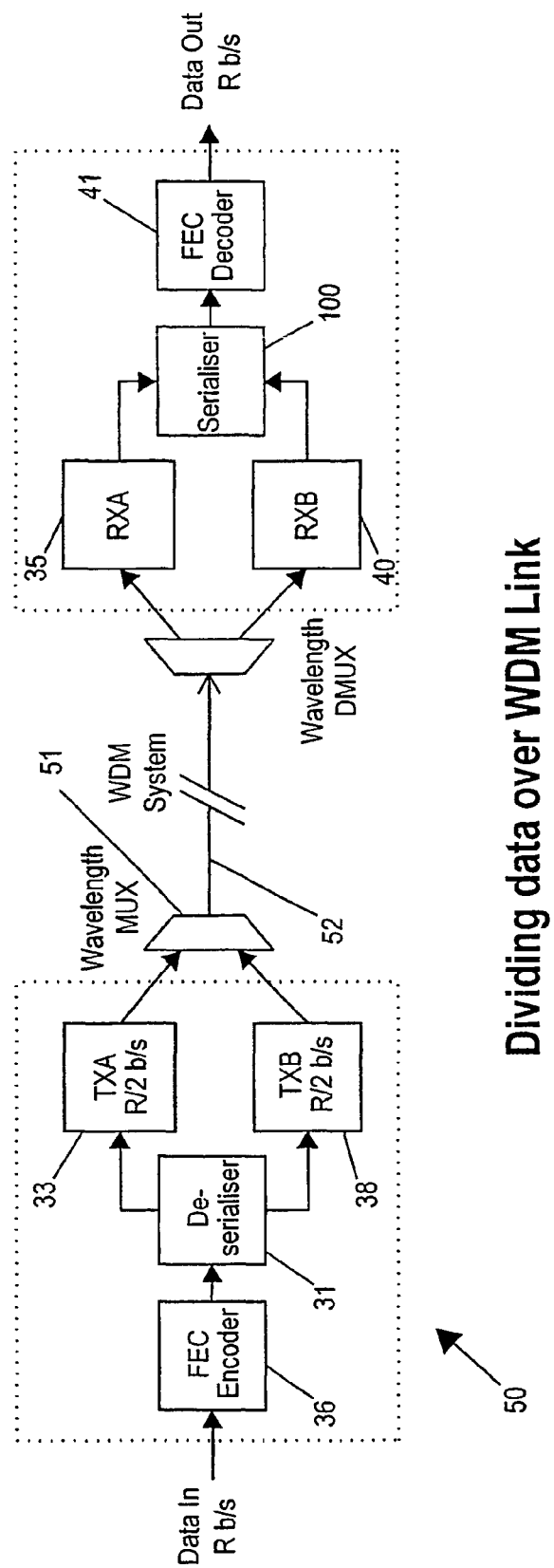
FIG. 6 is a schematic representation of a second embodiment of a transmission system according to the present invention.

Referring now to FIG. 6, a second embodiment of the invention comprises transmission system 50. Parts of the transmission system 50 which correspond to parts of transmission system 30 have been given corresponding reference numerals for ease of understanding. The transmission system 50 comprises a wavelength multiplexer 51 which multiplexes the sequence portions which are transmitted at different wavelengths. This allows both portions to be transmitted along a single optical fibre 52 since the two are transmitted at different wavelengths.

The system further comprises a wavelength demultiplexer 53 which demultiplexes the portions, one portion being transmitted to receiver 40 and the other portion being transmitted to receiver 35. The two signals are then recombined by serialiser 100 then decoded by FEC decoder 41.

Figure 7A:
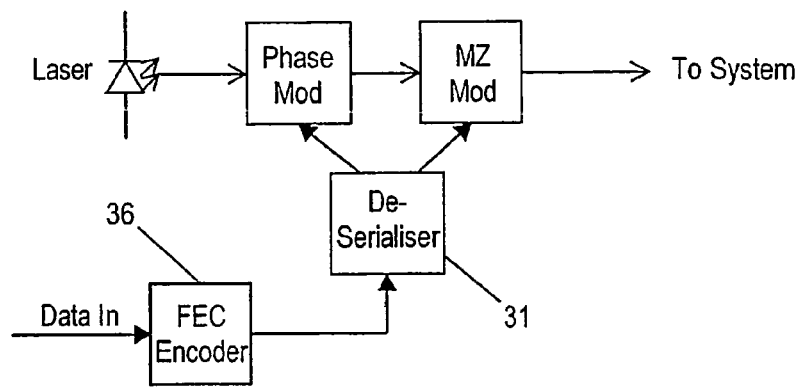
FIGS. 7a and 7b are schematic representations of a transmitter and receiver respectively forming part of a transmission system according to yet another embodiment of the present invention.
Figure 7B:
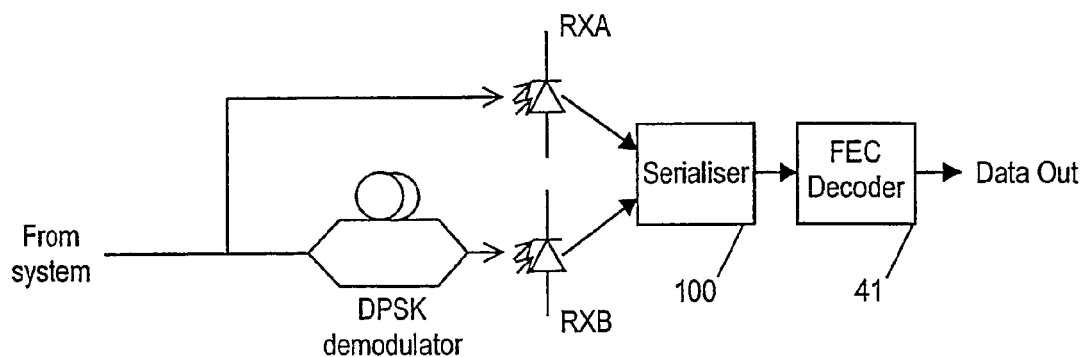

Referring now to FIGS. 7a and 7b, a third embodiment of the present intention is illustrated. Parts of the system which correspond to the systems of either FIG. 4 or FIG. 5 have been given corresponding reference numerals for ease of understanding.

Figure 8:
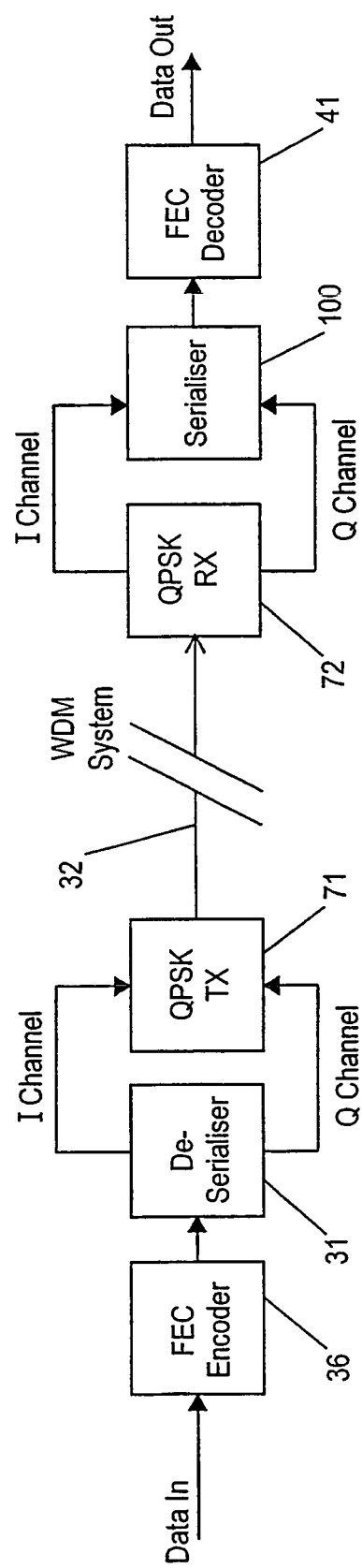
FIG. 8 is a schematic representation of a further embodiment of a transmission system according to the present invention.

Referring now to FIG. 8, a third embodiment of the present invention is in the form of a transmission system 70 in the form of a wavelength division Multiplex system. Parts of the transmission system 70 which correspond to parts in transmission systems 30 and 50 have been given corresponding reference numerals for ease of understanding.

Data is input into the system at a rate of 9.5 Gb/s. The data is encoded by FEC encoder 20 then divided into two sequence portions.

The two portions are directed to the quadrature phase key transmitter 71 in the form of a Q channels.

The sequence portions are transmitted via a system fibre 32 to a QPSK receiver 72. The signal is in the form of two phases, an in-phase channel and a quadrature phase channel. Both the in-phase channel and the quadrature channel are fed into the FEC decoder 41 in order that decoded data emerges from the system.

The invention claimed is:

1. A transmission system for transmitting data in a form of a digital signal including an information sequence, the data being transmitted at a predetermined rate, the system comprising:
 a FEC encoder for transforming the information sequence into a FEC encoded sequence comprising the information sequence and coding overhead;
 a partitioner for partitioning the encoded sequence into a plurality of sequence portions, so that the encoded sequence is transmitted as a plurality of separate channels, wherein the partitioner partitions the encoded sequence between two channels such that one part of the encoded sequence is identical to the information sequence and the other part is equivalent to coding overhead;
 wherein the sequence portions are transmitted at a rate which is lower than, and not equal to, the predetermined rate.

2. A transmission system according to claim 1 further comprising a decoder for decoding the encoded sequence after transmission.

3. A transmission system according to claim 1 further comprising a recombiner for recombining the encoded sequence after transmission.

4. A transmission system according to claim 3 wherein the recombiner comprises a differential phase shift keying demodulator.

5. A transmission system according to claim 1 wherein the partitioner comprises a Quadrature Phase Shift Keying Modulation (QPSK).

6. A transmission system according to claim 1 wherein the partitioner comprises a phase modulator.

7. A transmission system according to claim 1 wherein the partitioner comprises a wavelength multiplexer.

8. A transmission system according to claim 1 further comprising at least one waveguide.

9. A transmission system according to claim 8 wherein the waveguides are optical waveguides.

10. A transmission system according to claim 9 wherein the partitioner comprises a coupler which connects a first waveguide to a second waveguide.

11. A method of transmitting data in a form of a digital signal including an information sequence over an optical transmission system, the data being transmitted at a predetermined rate, the method comprising:
 applying forward error correcting code to the information sequence to transform the information sequence to an encoded sequence comprising the information sequence and a coding overhead;
 partitioning the encoded sequence between two channels such that one part of the encoded sequence is identical to the information sequence and the other part is equivalent to the coding overhead; and
 transmitting over fiber in the optical transmission system the encoded sequence over a plurality of channels such that the parts of the encoded sequence are transmitted over the fiber at a rate which is lower than, and not equal to, the predetermined rate.

12. The method according to claim 11 further comprising recombining the parts of the encoded sequence transmitted over the fiber with a serializer incorporated in the optical transmission system and applying forward error correcting decoding to the encoded sequence after recombination.

13. An encoding system for encoding a digital signal including an information sequence, the encoding system comprising:
 a FEC encoder for encoding the information sequence into an encoded sequence comprising the information sequence and a coding overhead;
 a partitioner for partitioning the encoded sequence into a plurality of sequence portions such that each sequence portion may be transmitted on a different channel wherein the partitioner partitions the encoded sequence between two channels such that one part of the encoded sequence is identical to the information sequence and the other part is equivalent to coding overhead;
 wherein the sequence portions are transmitted at a rate which is lower than, and not equal to, a predetermined rate.

* * * * *